United States Patent
Manabe

(10) Patent No.: US 8,911,532 B2
(45) Date of Patent: Dec. 16, 2014

(54) METHOD FOR LEACHING COPPER FROM COPPER SULFIDE ORE

(75) Inventor: Manabu Manabe, Tokyo (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/990,481

(22) PCT Filed: Dec. 9, 2011

(86) PCT No.: PCT/JP2011/078577
§ 371 (c)(1), (2), (4) Date: May 30, 2013

(87) PCT Pub. No.: WO2012/098783
PCT Pub. Date: Jul. 26, 2012

(65) Prior Publication Data
US 2013/0247720 A1    Sep. 26, 2013

(30) Foreign Application Priority Data

Jan. 20, 2011 (JP) ................................. 2011-009982

(51) Int. Cl.
C22B 15/00 (2006.01)
(52) U.S. Cl.
CPC ................................. C22B 15/0069 (2013.01)
USPC .......................................................... 75/743
(58) Field of Classification Search
CPC .................................................. C22B 15/0069
USPC ............................................................. 75/743
See application file for complete search history.

(56) References Cited

U.S. PATENT DOCUMENTS

| 8,163,063 B2 * | 4/2012 | Manabe ......................... 75/743 |
| 8,287,623 B2 * | 10/2012 | Manabe ......................... 75/742 |
| 2009/0241734 A1 | 10/2009 | Imagawa et al. |
| 2010/0018349 A1 | 1/2010 | Manabe |

FOREIGN PATENT DOCUMENTS

| JP | 2009-228109 A | 10/2009 |
| JP | 2010-24511 A | 2/2010 |

OTHER PUBLICATIONS

International Search Report issued in PCT/JP2011/078577, mailed on Feb. 21, 2012.

* cited by examiner

Primary Examiner — George Wyszomierski
Assistant Examiner — Tima M McGuthry Banks
(74) Attorney, Agent, or Firm — Birch, Stewart, Kolasch & Birch, LLP

(57) ABSTRACT

The present invention provides a method of leaching copper from a copper sulfide ore, wherein operating costs and environmental impacts can be effectively reduced. The present invention is a method of leaching copper from a copper sulfide ore by a process of leaching a layer of stacked ores, wherein the leaching solution containing Fe (III) ion and other leaching solution containing iodide ion are fed through routes independent of each other to a layer of stacked ores containing a copper sulfide ore.

2 Claims, 3 Drawing Sheets

METHOD FOR LEACHING COPPER FROM COPPER SULFIDE ORE

TECHNICAL FIELD

The present invention relates to a method of leaching copper from a copper sulfide ore. Specifically, the present invention relates to a method of leaching copper effectively reducing operating costs and environmental impacts in leaching copper from stacked ore bodies by stacking a copper sulfide ore, and particularly a copper sulfide ore containing poorly soluble ores in mineral acids such as chalcopyrite and by feeding an acid from the top of the heap to leach copper.

BACKGROUND TECHNOLOGY

It has been known that in a hydrometallurgical process of copper, leaching of copper is significantly promoted by adding iodine or iodide ion and Fe (III) ion to the leaching solution in order to recover copper by leaching a poorly soluble copper sulfide ore in mineral acids such as chalcopyrite (Patent Literature 1).

On the one hand, there is a problem of channeling phenomenon which causes only the flow paths of the leaching solution to be leached in the process of leaching copper. In contrast, when iodine, being a simple substance is added to the leaching solution, the iodine spreads widely within the layer of stacked ores in leaching processes such as heap leaching and dump leaching processes because of high volatility of iodine, being a simple substance. Therefore, channeling phenomenon is effectively prevented and results in no need for separately taking measures for this type of phenomena, achieving efficient leaching of copper. Accordingly, these effects become significant when particularly iodine, being a simple substance is used in leaching of a layer of stacked ores. (See JP 2009-193197 A filed on Aug. 14, 2009).

CITATION LIST

Patent Literature

Patent Literature 1: JP 2010-024511 A

SUMMARY OF INVENTION

Technical Problem

The higher the concentration of iodine in a leaching solution the faster the leaching rate of copper will be, but in such a case there is a problem that iodine is lost by volatilization from the surface of a layer of stacked ores resulting in an increase in iodine usage and a rise in operating costs as well as an increase in environmental impacts.

Further, in heap leaching, a rubber tube or a plastic tube is generally used for feeding a leaching solution, and iodine, being a single substance is adsorbed by and penetrated into the tube by some degree depending on the material properties because of hydrophobic properties of iodine. The length of a tube used herein is generally several hundred meters and further the leaching operation may take place over several years so that the amount of hydrophobic iodine, being a simple substance adsorbed and accumulated within the tube is too large to ignore, and further causing deterioration of the tube and the loss of iodine. Furthermore, iodine, being a single substance is penetrated not only into the surface of the inside of the tube but also into the deep layer of the tube to cause its deterioration.

Therefore, when a copper sulfide ore is leached with an iodine-added leaching solution, iodine and the iron (III) ion playing a role as an electron acceptor have to be fed via an appropriate means to avoid loss of iodine via volatilization and adsorption as well as to prevent deterioration of the tube for feeding the leaching solution.

The present invention thus has its objective to provide a method of leaching copper from a copper sulfide ore, wherein operating costs and environmental impacts can be effectively reduced.

Solution to Problem

The present inventor has made extensive studies to solve the problems, and as a result, has found that when copper is recovered from a copper sulfide ore containing chalcopyrite or the like by a hydrometallurgical process using the process of leaching a layer of stacked ores, loss of iodine caused by volatilization and adsorption can be avoided not by mixing a leaching solution containing the Fe (III) ion with a leaching solution containing the iodide ion before being fed to a layer of stacked ores, but by feeding each leaching solution through routes independent of each other to a layer of stacked ores containing a copper sulfide ore, and deterioration of a tube for feeding the leaching solution can be prevented.

The present invention, which was completed on the basis of the findings described above is a method of leaching copper from a copper sulfide ore in one aspect by the use of the process of leaching a layer of stacked ores, in which the leaching solution containing the Fe (III) ion and other leaching solution containing the iodide ion are fed through routes independent of each other to a layer of stacked ores containing a copper sulfide ore.

In one embodiment of a method of leaching copper from a copper sulfide ore of the present invention, a major component of the ore containing the copper sulfide ore is chalcopyrite.

Advantageous Effects of Invention

According to the present invention, a method of leaching copper from a copper sulfide ore in which operating costs and environmental impacts are effectively reduced can be provided.

DESCRIPTION OF EMBODIMENT

Figure 1:
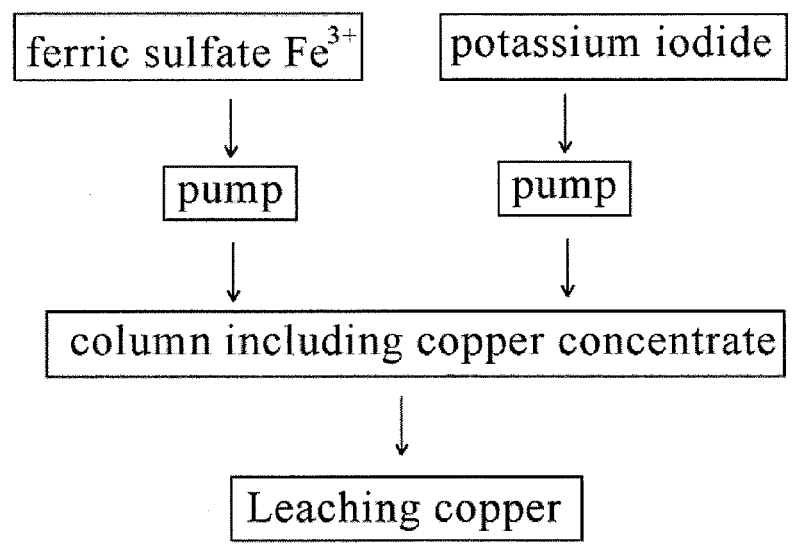
FIG. 1 is a flowchart of a leaching method in Example 1.

Hereinafter, an embodiment of a method of leaching copper from a copper sulfide ore related to the present invention will be described.

A target ore for the leaching method of the present invention is not particularly limited as long as an ore contains a copper sulfide ore, but it is preferred that a major component of the ore containing a copper sulfide ore is chalcopyrite, from which copper is difficult to be leached by a general method. In addition to the ore containing a copper sulfide ore including chalcopyrite as a major component, the ore containing various species of copper sulfide minerals, in which chalcopyrite is contained in parts of ore can be used, and the content of chalcopyrite is not particularly limited. Further, a mixed ore including a copper sulfide ore and a copper oxide ore can be used.

Among processes for leaching a layer of stacked ores, both forms of heap leaching and dump leaching can be applied as a leaching method of the present invention as long as copper hydrometallurgy based on a sulfuric acid solution as a leaching solution is used. Leaching is performed at normal temperature and particularly steam heating or the like is not required.

It is considered that among copper sulfide ores which are the target ores for the leaching method of the present invention, dissolution and leaching of chalcopyrite proceed according to the series of catalytic reactions with iodine as illustrated in the following formulas 1 and 2.

$$2I^- + 2Fe^{3+} \rightarrow I_2 + 2Fe^{2+}$$ (Formula 1)

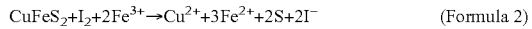

$$CuFeS_2 + I_2 + 2Fe^{3+} \rightarrow Cu^{2+} + 3Fe^{2+} + 2S + 2I^-$$ (Formula 2)

At first, in the reaction of formula 1, the iodide ion added to a leaching solution is dissociated to the iodide ion ($I^-$), and the iodide ion ($I^-$) is oxidized by the iron (III) ion ($Fe^{3+}$) to form iodine ($I_2$) which plays a role of the catalyst.

Then, in the reaction of formula 2, chalcopyrite is oxidized by iodine ($I_2$) formed in the reaction of formula 1 and the Fe (III) ion ($Fe^{+3}$), and releases the copper ion ($Cu^{2+}$).

As illustrated in formulas 1 and 2, leaching of copper from a copper sulfide ore is carried out by oxidation reaction of a copper sulfide ore with the iron (III) ion ($Fe^{3+}$) using iodine ($I_2$) as a catalyst, but solubility of iodine in water is low. Therefore, an iodide which is readily dissociated to the iodide ion ($I^-$) in a leaching solution is provided to the leaching solution to prepare other leaching solution. The iodide herein is not particularly limited as long as it is soluble in water and generates the iodide ion, and for example, sodium iodide, potassium iodide, ammonium iodide, and hydrogen iodide can be used. Iodine can be also recovered from the solution for recycle after leaching copper.

In a series of the reaction formulas, the ultimate electron acceptor is the iron (III) ion ($Fe^{3+}$), and the solution containing $Fe^{3+}$ (first leaching solution) has to be fed in order to generate iodine, being a simple substance from the iodide ion involved in parts of the catalytic cycle. The supply source for the iron (III) ion ($Fe^{3+}$) is not particularly limited, and iron (III) sulfate or iron (III) chloride, or products obtained by oxidation of the iron (II) ion in an iron (II) sulfate solution can be used.

A method of leaching copper from a copper sulfide ore in the present invention is characterized in that copper is leached by a process of leaching a layer of stacked ores by feeding the leaching solution containing the iron (III) ion and other leaching solution containing the iodide ion described above through routes independent of each other to a layer of stacked ores containing copper sulfide ore. A form for feeding each leaching solution is not particularly limited, and for example, the leaching solution containing the iron (III) ion stored in a tank and other leaching solution containing the iodide ion stored in another tank are simultaneously but independently fed via the each tube, respectively, to the top of a layer of stacked ores containing a copper sulfide ore, and the both leaching solution meet and mix each other inside the layer of stacked ores.

According to such a constitution, the leaching solution containing the iron (III) ions is not mixed with other leaching solution containing the iodide ion before being fed to a layer of stacked ores containing a copper sulfide ore. Formation of iodine ($I_2$) in a leaching solution before feeding the leaching solution to a layer of stacked ores can be thus avoided. Therefore, the loss of iodine by volatilization from the surface of a layer of stacked ores can be prevented, thereby allowing for effectively reducing operating costs and environmental impacts. Further, adsorption and accumulation of iodine, being a simple substance in a tube for feeding the leaching solution to a layer of stacked ores can be prevented, thereby allowing for effectively preventing deterioration of a tube for feeding the leaching solution and loss of iodine.

EXAMPLES

Hereinafter, examples of the present invention will be described, but the examples are merely for an illustrative purpose, and in no way to limit the invention.

Example 1

As a copper ore for a target, a crude ore mined in Chile containing approximately 50% by mass of chalcopyrite were used. The grade of a crude ore was 0.52% by mass of Cu, 1.5% by mass of Fe, and 0.86% by mass of S.

A transparent polyvinyl chloride tube, 10 cm in diameter and sealed at the bottom with a perforated plate and a filter fabric, was packed with 12 kg of the crude ore to form a column (layer of stacked ores) for a leaching test.

Figure 2:
FIG. 2 is pictures of external appearance of a column for leaching copper and a plastic tube for feeding a leaching solution to the column for leaching copper in Example 1.

Using ferric sulfate, the leaching solution with pH 1.5 containing 5 g/L of $Fe^{+3}$ and other leaching solution adjusted to pH 1.8 by sulfuric acid containing 260 mg/L of potassium iodide were prepared. Subsequently, as illustrated in FIGS. 1 and 2, each leaching solution was fed by independent pumps through plastic tubes at a rate of 1 L/day from the top of the column for leaching copper.

Comparative Example 1

As a copper ore for the target, a crude ore mined in Chile containing approximately 50% by mass of chalcopyrite was used similarly to Example 1. The grade of the crude ore was 0.52% by mass of Cu, 1.5% by mass of Fe, and 0.86% by mass of S.

A transparent polyvinyl chloride tube, 10 cm in diameter and sealed at the bottom with a perforated plate and a filter fabric, was packed with 12 kg of a crude ore to form the column (a layer of stacked ores) for the leaching test.

Figure 3:
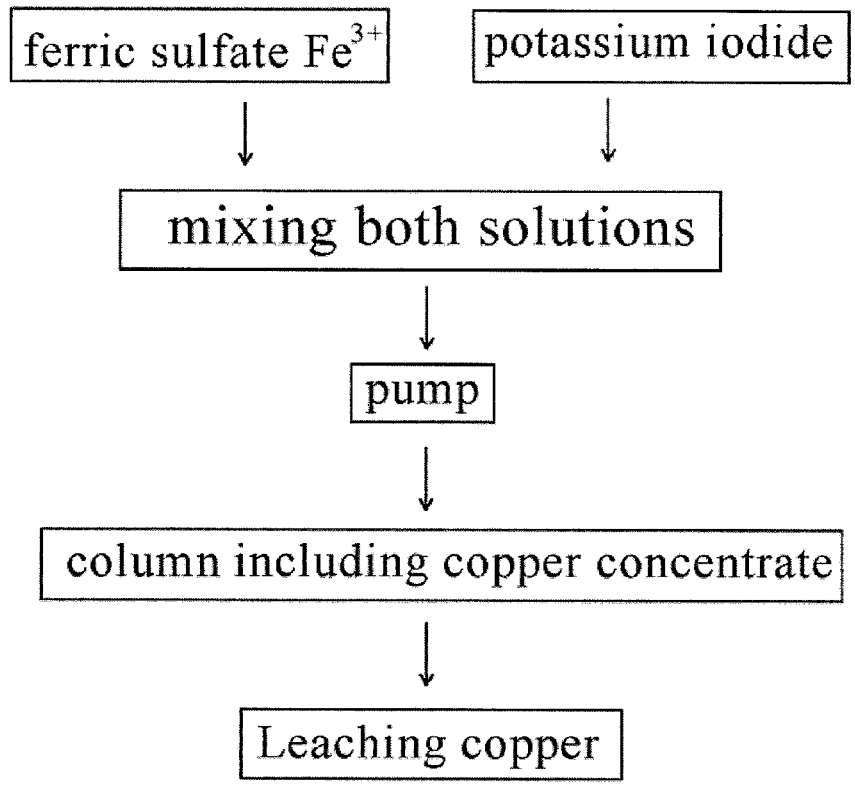
FIG. 3 is a flowchart of a leaching method related to Comparative Example 1.
Figure 4:
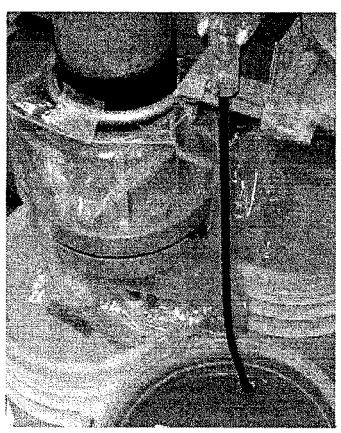
FIG. 4 is pictures of external appearance of a column for leaching copper and a plastic tube for feeding a leaching solution to the column for leaching copper in Comparative Example 1.

A leaching solution containing 2.5 g/L of $Fe^{3+}$ using ferric sulfate and 130 mg/L of potassium iodide, which was adjusted to pH 1.8 by sulfuric acid, was prepared. That is, in Comparative Example 1, the leaching solution containing the Fe (III) ion and the leaching solution containing the iodide ion were not fed independently but mixed together before being fed to the column for leaching copper. Subsequently, as illustrated in FIGS. 3 and 4, using a pump the mixed leaching solution was fed through a single plastic tube at a rate of 2 L/day from the top of the column for leaching copper.

In Example 1 and Comparative Example 1, the amount of iodine contained in a leaching solution was determined by the ion electrode method after reduction with zinc.

The concentration of copper contained in a leaching solution was also determined by an inductive-coupled plasma (ICP) optical emission spectrometer.

Further, the volume of the solution after leaching copper was determined so as to convert the iodine concentration and copper concentration into the leaching rate of copper and the recovery rate of iodine, respectively.

Figure 5:
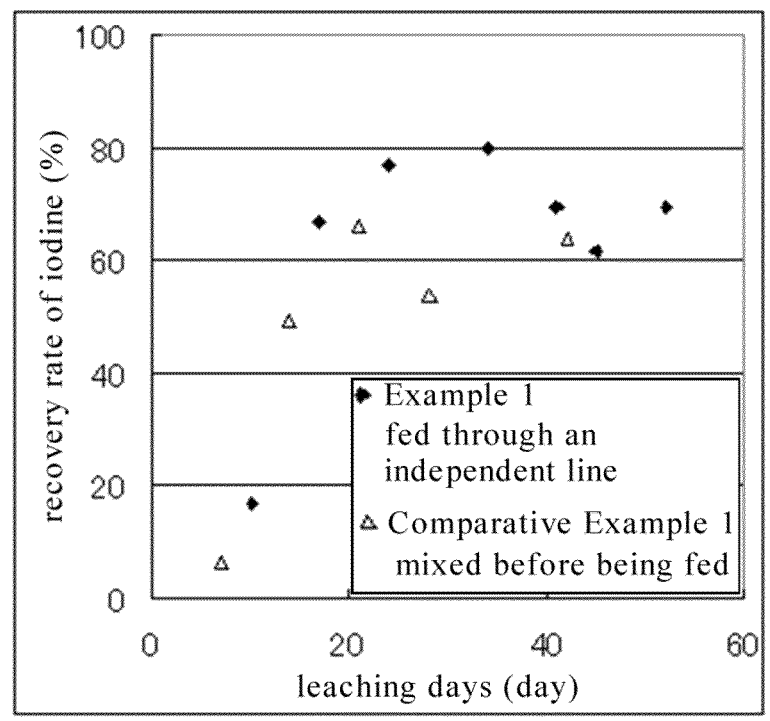
FIG. 5 is the results of determining the recovery rate of iodine in Example 1 and Comparative Example 1.
Figure 6:
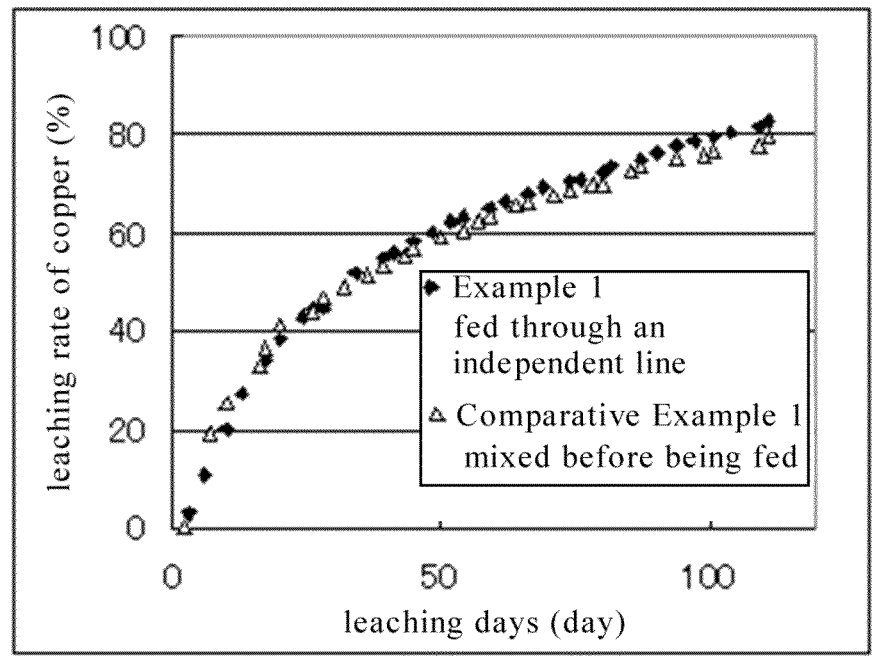
FIG. 6 is the results of determining the leaching rate of copper in Example 1 and Comparative Example 1.

FIGS. 5 and 6 illustrate the recovery rate of iodine and the leaching rate of copper, respectively, as the test results in Example 1 and Comparative Example 1.

It was confirmed from FIG. 5 that the recovery of iodine is extremely high in Example 1 in which the leaching solution containing the Fe (III) ion and other leaching solution containing the iodide ion are fed through an independent line to the column for leaching copper, as compared to Comparative Example 1 in which both solutions are mixed before being fed to the column for leaching copper. Specifically, the average recovery rate of iodine in Example 1 was 63% over the period of day 1 to day 52 in feeding the leaching solution, whereas the average recovery rate in Comparative Example 1 was 48%.

As illustrated in FIG. 4, in Comparative Example 1, iodine was adsorbed and deposited on a plastic tube to which is used for the leaching solution feeding, so the color of the tube turns to reddish-black. In contrast, such change of the tube color was not observed in Example 1.

Further, according to FIG. 6, in leaching behavior of copper there was no significant difference between Example 1 and Comparative Example 1.

The invention claimed is:

1. A method of leaching copper from a copper sulfide ore by a process of leaching a layer of stacked ores, wherein a leaching solution containing Fe (III) ion and other leaching solution containing iodide ion are fed through routes independent of each other to a layer of stacked ores containing a copper sulfide ore.

2. A method of leaching copper from a copper sulfide ore according to claim 1, wherein a major component of the ore containing the copper sulfide ore is chalcopyrite.

* * * * *